US010837569B2

(12) United States Patent
Iammatteo et al.

(10) Patent No.: US 10,837,569 B2
(45) Date of Patent: Nov. 17, 2020

(54) FLOW CONTROL VALVE AND METHOD OF MANUFACTURING FLOW CONTROL VALVE HOUSING

(71) Applicant: I.F. Associates, Inc., Allenwood, NJ (US)

(72) Inventors: Pasquale A. Iammatteo, Holmdel, NJ (US); Roman Bicej, Ocean Township, NJ (US)

(73) Assignee: I.F. Associates, Inc., Allenwood, NJ (US)

( * ) Notice: Subject to any disclaimer, the term of this patent is extended or adjusted under 35 U.S.C. 154(b) by 0 days.

(21) Appl. No.: 16/577,144

(22) Filed: Sep. 20, 2019

(65) Prior Publication Data

US 2020/0011443 A1    Jan. 9, 2020

Related U.S. Application Data

(62) Division of application No. 15/282,117, filed on Sep. 30, 2016, now Pat. No. 10,422,434.

(Continued)

(51) Int. Cl.
| | |
|---|---|
| *F16K 27/02* | (2006.01) |
| *F16K 1/12* | (2006.01) |
| *F16K 15/02* | (2006.01) |
| *B05B 1/30* | (2006.01) |
| *B05B 1/32* | (2006.01) |

(Continued)

(52) U.S. Cl.
CPC ........ *F16K 27/0209* (2013.01); *B05B 1/3006* (2013.01); *B05B 1/323* (2013.01); *B05B 11/0062* (2013.01); *B05B 11/3061* (2013.01);

*B05B 11/3097* (2013.01); *F16K 1/126* (2013.01); *F16K 1/36* (2013.01); *F16K 15/026* (2013.01)

(58) Field of Classification Search
CPC ........ F16K 27/0209; F16K 1/126; F16K 1/36; F16K 15/026; B05B 1/3006; B05B 1/323; B05B 11/0062; B05B 11/3061; B05B 11/3097
See application file for complete search history.

(56) References Cited

U.S. PATENT DOCUMENTS

| | | | | |
|---|---|---|---|---|
| 2,963,265 A | ‡ | 12/1960 | Goodspeed, Jr. ...... | B65D 83/14 222/402.13 |
| 4,383,553 A | ‡ | 5/1983 | Platt ...................... | F16K 25/04 137/625.4 |

(Continued)

*Primary Examiner* — Marina A Tietjen
(74) *Attorney, Agent, or Firm* — NSIP Law

(57) ABSTRACT

In one general aspect, a flow control valve includes: a housing including a tubular wall surrounding an interior passage, and a flow control section in which the tubular wall includes a conical inner wall surface; a protrusion disposed on an exterior surface of the tubular wall at the flow control section; a sealing member disposed in the housing and configured to be selectively moved to a sealing position in which the sealing member engages the conical inner wall surface to restrict flow of a fluid through the interior passage; and a recess disposed the conical inner wall surface and configured to allow the fluid to flow past the sealing member through the recess when the sealing member is in the sealing position, wherein the recess and the protrusion are radially aligned on the tubular wall.

2 Claims, 7 Drawing Sheets

Related U.S. Application Data

(60) Provisional application No. 62/235,125, filed on Sep. 30, 2015.

(51) Int. Cl.
*B05B 11/00* (2006.01)
*F16K 1/36* (2006.01)

(56) References Cited

U.S. PATENT DOCUMENTS

| | | | | |
|---|---|---|---|---|
| 4,424,936 A | ‡ | 1/1984 | Marc | A01G 25/023 239/271 |
| 4,431,030 A | ‡ | 2/1984 | Nachazel | A47J 37/0828 138/45 |
| 5,345,965 A | * | 9/1994 | Blume | F04B 53/1027 137/516.29 |
| 6,325,255 B1 | ‡ | 12/2001 | Lane | B67D 1/0406 138/46 |
| 2005/0229887 A1 | * | 10/2005 | Sailer | F01L 1/24 123/90.55 |
| 2014/0311596 A1 | ‡ | 10/2014 | Kim | F04B 25/04 137/528 |

\* cited by examiner
‡ imported from a related application

FLOW CONTROL VALVE AND METHOD OF MANUFACTURING FLOW CONTROL VALVE HOUSING

CROSS-REFERENCE TO RELATED APPLICATIONS

This application is a divisional of U.S. patent application Ser. No. 15/282,117 filed on Sep. 30, 2016 which claims the benefit under 35 USC 119(e) of U.S. Provisional Application No. 62/235,125 filed on Sep. 30, 2015, the entire disclosure of which is incorporated herein by reference for all purposes.

BACKGROUND

1. Field

The following description generally relates to flow control valves.

2. Description of Related Art

Flow control valves are used in many applications in which it is desirable to control the flow of fluid in a device or system. Examples of flow control valves are directional check valves, flow restricting valves and dispensing valves.

A directional check valve is biased in a closed configuration in which a sealing member prevents fluid flow through the valve, and the sealing member is moveable to place the valve in an open configuration in which the sealing member permits fluid flow through the valve in only a desired direction. More specifically, sufficient pressure from fluid flowing in the desired direction forces the sealing member to move to open the valve, allowing the fluid to flow through the valve in the desired direction. Backward fluid flow ("backflow") in a direction opposite the desired direction while the valve is open forces the sealing member to move to close the valve.

One type of flow restricting valve allows fluid to flow therethrough in two opposing directions. The valve is biased in a closed configuration in which a sealing member permits a relatively small amount of backflow through the valve. The sealing member is moveable to place the valve in an open configuration in which a relatively large amount of fluid flow is permitted through the valve in a desired direction. Backflow opposite the desired direction while the valve is in the open configuration forces the sealing member to move to close the valve. The controlled backflow allowed through the valve while the valve is in the closed configuration may prevent fluid from being trapped in an area forward of the valve for extended periods of time when there is no fluid flow in the forward direction.

A dispensing valve includes a control mechanism for selectively opening the valve. The valve may be biased in a closed position in which a sealing member prevents fluid flow through the valve. The control mechanism may be operated to move the sealing member to open the valve and allow fluid flow through the valve in a desired direction.

The various flow control valves described above are often complex and expensive to manufacture. For example, some flow control valves may open and/or close too slowly, or may have sealing members that do not provide consistent, reliable sealing to prevent or restrict fluid flow.

Accordingly, it is desirable to provide flow control valves that are inexpensive to manufacture and provide improved performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a flow control valve includes: a housing including a tubular wall surrounding an interior passage, and a flow control section in which the tubular wall includes a conical inner wall surface; a protrusion disposed on an exterior surface of the tubular wall at the flow control section; a sealing member disposed in the housing and configured to be selectively moved to a sealing position in which the sealing member engages the conical inner wall surface to restrict flow of a fluid through the interior passage; and a recess disposed the conical inner wall surface and configured to allow the fluid to flow past the sealing member through the recess when the sealing member is in the sealing position, wherein the recess and the protrusion are radially aligned on the tubular wall.

The housing may be formed of plastic.

The sealing member may include a body including an internal cavity.

The internal cavity may contain a gas.

In another general aspect, a method of manufacturing a flow control valve housing includes flowing a fluid material into a mold to form a housing including a tubular wall surrounding an interior passage, and a flow control section in which the tubular wall includes a conical inner wall surface, wherein the tubular wall has a predetermined radial thickness in the flow control section. The method further includes flowing the fluid material into the mold to form a protrusion disposed on an external surface of the tubular wall at the flow control section, wherein the protrusion extends in a radial direction with respect to a central axis of the tubular wall and has a predetermined thickness in a direction perpendicular to the radial direction, and cooling and solidifying the fluid material in the mold to cause a recess to form on the inner wall surface in a position radially aligned with the protrusion on the tubular wall.

The recess may have a radial depth that is a predetermined function of the radial wall thickness and the protrusion thickness.

In another general aspect, a valve includes: a housing including a tubular wall surrounding an interior passage, and a flow control section in which the tubular wall includes a conical inner wall surface; and a sealing member including a body including an interior cavity, wherein the sealing member is disposed in the housing and is configured to be selectively moved to a sealing position in which the body engages the conical inner wall surface to restrict flow of a fluid through the housing.

The body may further include a hemispherical tip configured to engage the conical inner wall surface.

The interior cavity may contain a gas.

The valve may further include a biasing member configured to bias the sealing member in the sealing position.

The valve may further include a control mechanism, wherein: the control mechanism includes a body member, and a rod connected to the body member and configured to engage the sealing member; and the rod is configured to move the sealing member from the sealing position to an open position allowing flow of the fluid through the housing, in response to the body member being moved in a direction opposite a direction of a biasing force applied by the biasing member.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent to those of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of well-known functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIGS. 1A-1E show a flow control valve 100 according to an example. The flow control valve 100 may be considered to be a flow restricting valve that, when in a closed configuration, is configured to allow a predetermined amount of backflow of fluid. That is, the flow control valve 100, when closed, is configured to allow a small amount of fluid flow in the backward direction R opposite the forward direction F of fluid flow allowed when the valve is open.

Figure 1A:
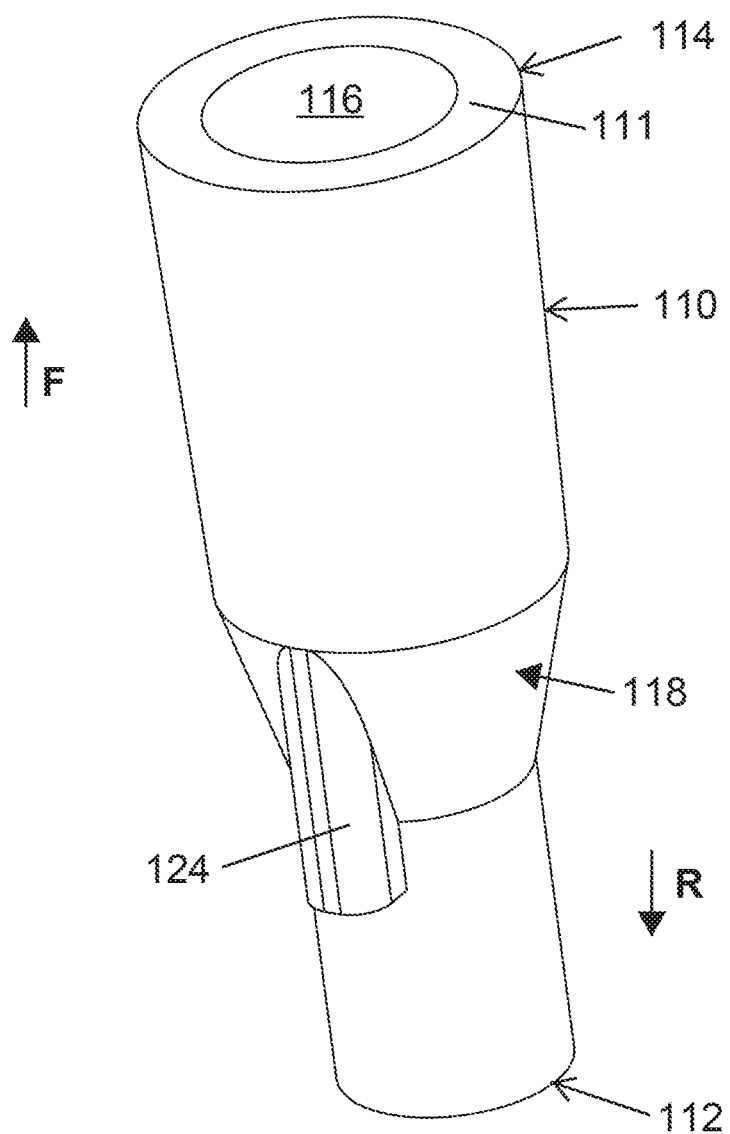
FIG. 1A is a perspective view of a flow control valve according to an example.
Figure 1B:
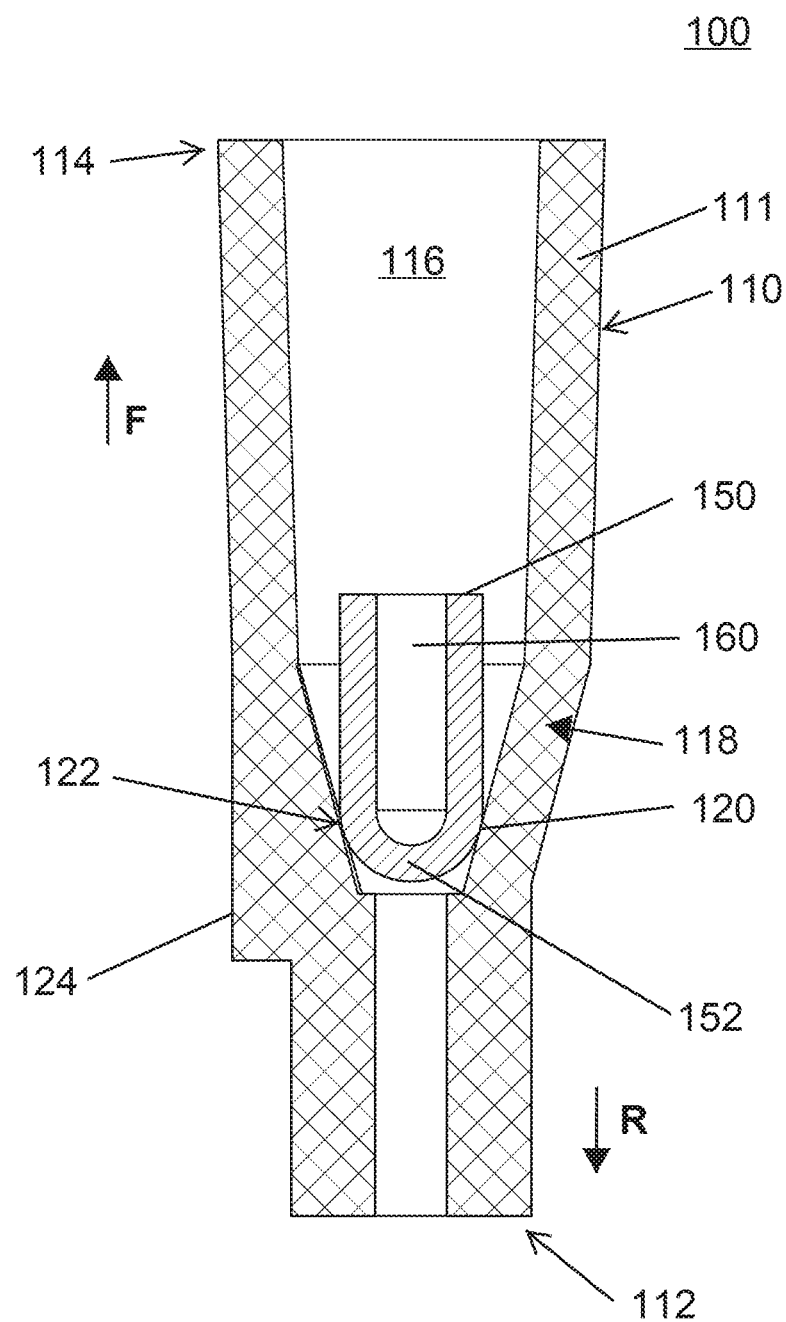
FIG. 1B is a top view of the flow control valve of FIG. 1A.
Figure 1C:
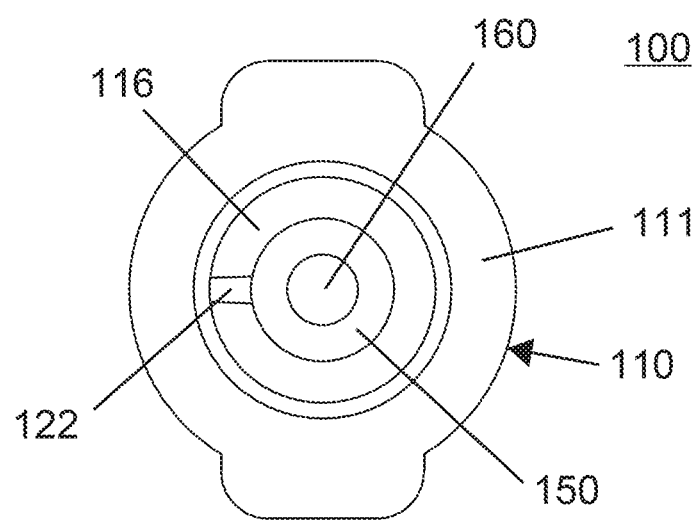
FIG. 1C is a side cross-sectional view taken along line A-A of FIG. 1B.
Figure 1D:
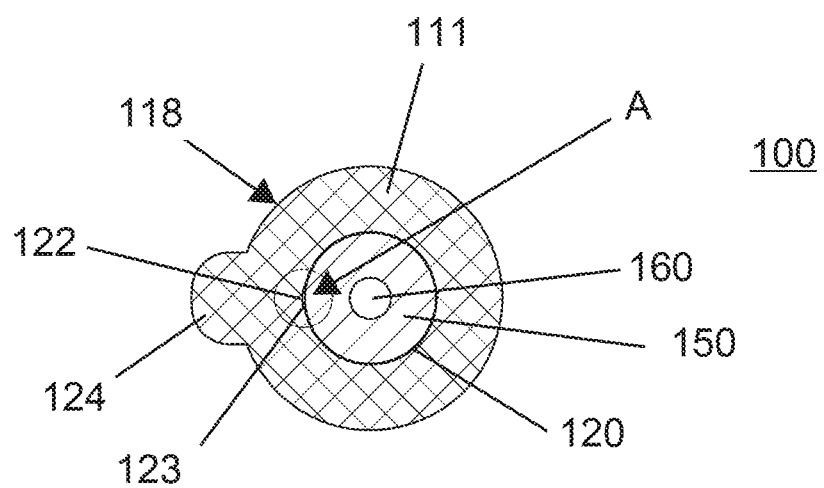
FIG. 1D is a bottom cross-sectional view taken along line B-B of FIG. 1C.
Figure 1E:
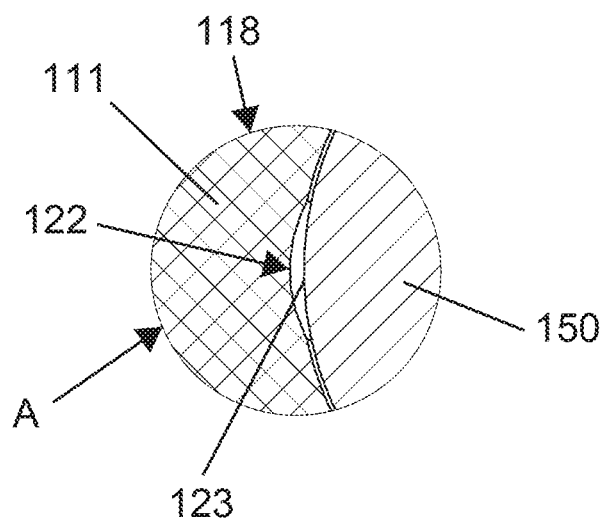
FIG. 1E is an enlarged view of a portion A of FIG. 1D.

As shown in FIGS. 1A-1E, the flow control valve 100 includes a hollow housing 110 and a plunger or sealing member 150 configured to reciprocate within the housing 110 to control the flow of the fluid through the housing 110. The housing 110 includes a generally tubular wall 111, and includes a first end 112 and a second end 114. The tubular wall 111 surrounds an interior passage 116 extending from the first end 112 to the second end 114, and includes a flow control section 118 between the first end 112 and the second end 114. The flow control section 118 includes a conical inner wall surface 120 in the interior of the housing 110. The conical inner wall surface 120 provides a conical sealing surface for the sealing member 150. As shown in FIGS. 1A, 1B and 1D, an external protrusion 124 is formed on an external surface of the tubular wall 111 at the flow control section 118 and extends from the external surface of the tubular wall 111 in a radial direction X with respect to a central axis C of the passage 116. As shown in FIGS. 10-1E, a sink or recess 122 is formed in the conical inner wall surface 120. As will be explained in detail later, the protrusion 124 and the sink or recess 122 are radially aligned with each other on opposing sides of the tubular wall 111.

Referring to FIG. 1B, the sealing member 150 is a vial-shaped body including a hemispherical tip 152 for engaging the conical inner wall surface 120. The sealing member 150 has an interior cavity 160 which may be filled with a gas, such as air, to improve buoyancy. The sealing member 150 may be constructed of a plastic or another polymer material, preferably of low density.

The sealing member 150 is biased in a sealing position in which the hemispherical tip 152 engages the conical inner wall surface 120 and forms a partial seal in the interior passage 116. When the sealing member 150 is in the sealing position, the flow control valve 100 is considered to be in a closed configuration. When a sufficient amount of fluid flow in the forward direction F from the first end 112 to the second end 114 is present in the interior passage 116, sealing member 150 is forced to move out of the sealing position into an open position in the direction F. The flow control valve 100 is thereby placed in an open configuration in which fluid flow is permitted through the interior passage 116 in the direction F. After fluid flow in the forward direction F ceases, the sealing member 150 returns to the sealing position.

As shown in FIGS. 1C-1E, when the sealing member 150 is in the sealing position, the seal between the sealing member 150 and the conical inner wall surface 120 is not completely fluid-tight, since the recess 122 forms a gap 123 between the sealing member 150 and the conical inner wall surface 120. Thus, when the sealing member 150 in the sealing position, the flow control valve 100 is considered to be closed, and heavily restricts but does not completely block fluid flow in the backward direction R from the second end 114 to the first end 112. That is, when the flow control valve 100 is closed, a small amount of fluid flow, relative to the amount of fluid flow permitted in the forward direction F when the valve is open, is permitted in the backward direction R. Thus, fluid that present in the interior passage 116 forward of the area at which the sealing member 150 engages the conical inner wall surface 120 is permitted to flow backward through the gap 123 in the direction R at a predetermined rate. As will be described later in detail, the rate at which fluid is allowed to flow in the direction R is permitted to flow in the direction R is determined by the size of the gap 123, which is a function of the size of the recess 122.

The combination of a low-density material construction and the gas-filled interior cavity 160 makes the sealing member 150 highly buoyant, and therefore enables rapid movement of the sealing member 70 from the sealing position to the open position for improved responsiveness of the flow control valve 100.

Figure 2:
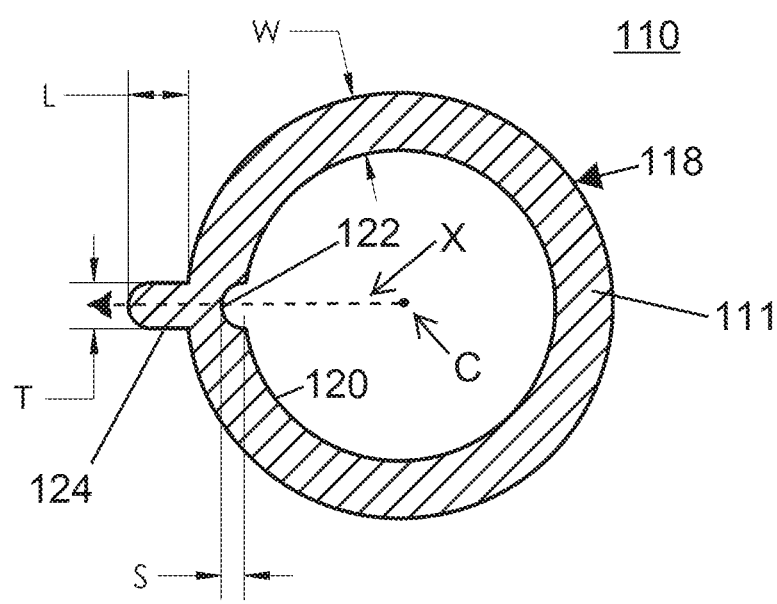
FIG. 2 is a bottom cross-sectional view of a housing of the flow control valve of FIG. 1A.

Referring to FIG. 2, the housing 110 is a substantially tubular member having a radial wall thickness "W" in the flow control section 118. The protrusion 124 has a radial length L in the radial direction X, and a thickness "T" in a direction perpendicular to the radial direction X. The recess 122 has a radial depth "S" in the radial direction X, and the radial depth S may be selected to provide the desired fluid flow rate (backflow rate) in the direction R. The backflow rate for the will increase as S increases. The housing 110 may be constructed of plastic, polymer material, or other material with suitable performance characteristics (such as shrinkage properties), for example, and may be manufactured by a molding process, as described below, such that W, T and S may be precisely determined.

The housing 110 may be manufactured by injecting or flowing a fluid material, such as a liquid polymer, liquid metal or other suitable material, into a mold shaped to provide the desired wall thickness W and protrusion thickness T. More specifically, according to an embodiment, a method of molding the housing 110 includes flowing a fluid material into a first section of a mold that is configured to form the housing 110 including the tubular wall 111 having the flow control section 118, and flowing the fluid material into a second section of the mold that is configured to form the protrusion 124 on the external surface of the flow control section 118. The first section of the mold may be configured to form the flow control section 118 to have the predetermined radial wall thickness W, and the second section of the mold may be configured to form the protrusion 124 to have the predetermined protrusion thickness T. The method further includes cooling and solidifying the fluid material in the mold to form the housing 110. The cooling and solidifying of the fluid material causes shrinkage of the inner wall surface in the area opposite to the protrusion 124 and thereby forms the recess 122 in the area opposite to the protrusion 124, such that the recess 122 and the protrusion 124 are radially aligned. The size of the recess 122 is a function of the radial wall thickness W, and the size and shape of the protrusion 124. More specifically, the radial depth S of the recess 122 is a predetermined function of the radial wall thickness W and the protrusion thickness T. Thus, the mold can be designed to provide a protrusion thickness T and wall thickness W that will reliably produce the desired radial depth S of the recess through shrinkage of the inner wall surface during the molding process.

Figure 3:
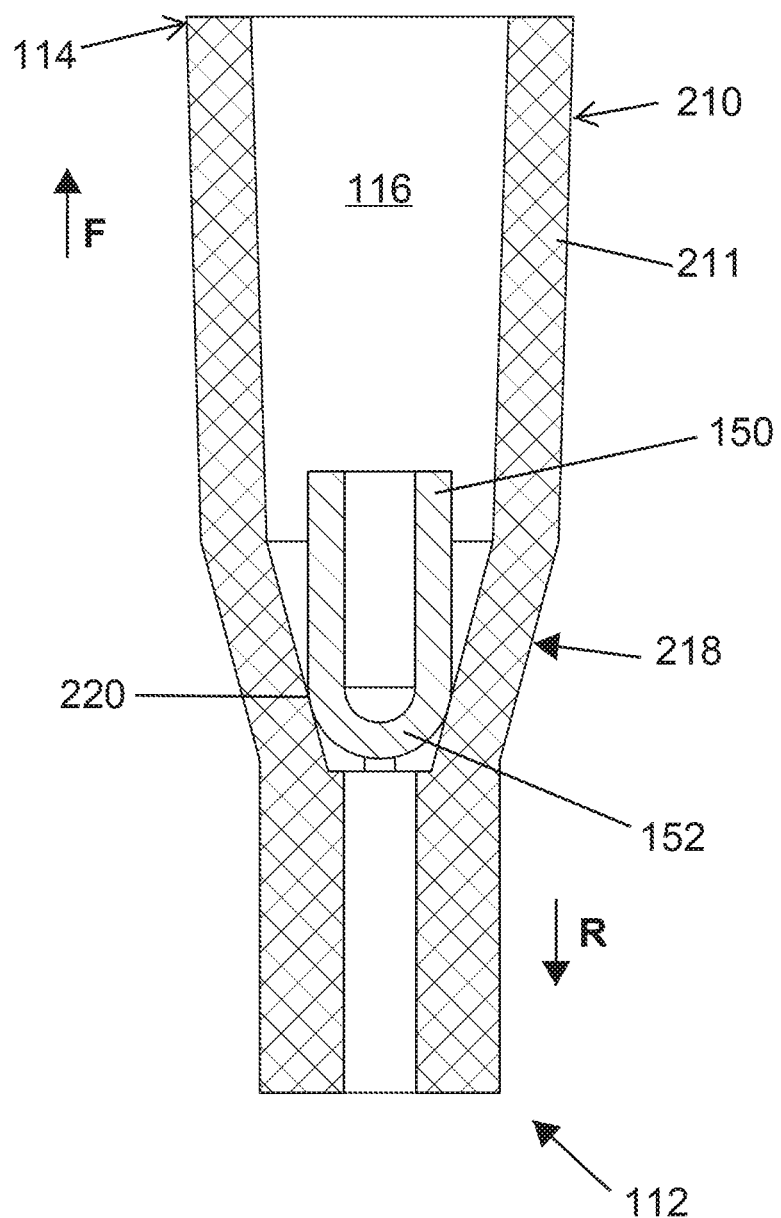
FIG. 3 is a side cross-sectional view of a flow control valve according to another example.

FIG. 3 shows a flow control valve 200 according to another example. The flow control valve 200 may be considered to be a directional check valve. The flow control valve 200 is similar to the valve 100 of FIGS. 1A-1E, except that the flow control valve 200 includes a housing 210. The housing 210 is similar to the housing 110 of the previous example, with the exception that the housing 210 includes a tubular wall 211 with a flow control section 218 that lacks the protrusion 124 of the valve 100.

The flow control section 218 includes a conical inner wall surface 220 that provides a conical sealing surface for the sealing member 150. The conical inner wall surface 220 does not include the recess 122 of the conical inner wall surface 120 of the previous embodiment, and therefore forms a flat, uniform surface for engaging the sealing member 150. Thus, contrary to the valve of FIGS. 1A-1E, when the flow control valve 200 is in a closed configuration in which the hemispherical tip 152 of the sealing member 150 engages the conical inner wall surface 220, a complete seal is formed between the sealing member 150 and the conical sealing surface 220. Accordingly, the flow control valve 200 allows fluid flow only in the forward direction F when the flow control valve 200 is open, and blocks fluid flow in both the forward direction F and the backward direction R when the flow control valve 200 is closed.

Figure 4:
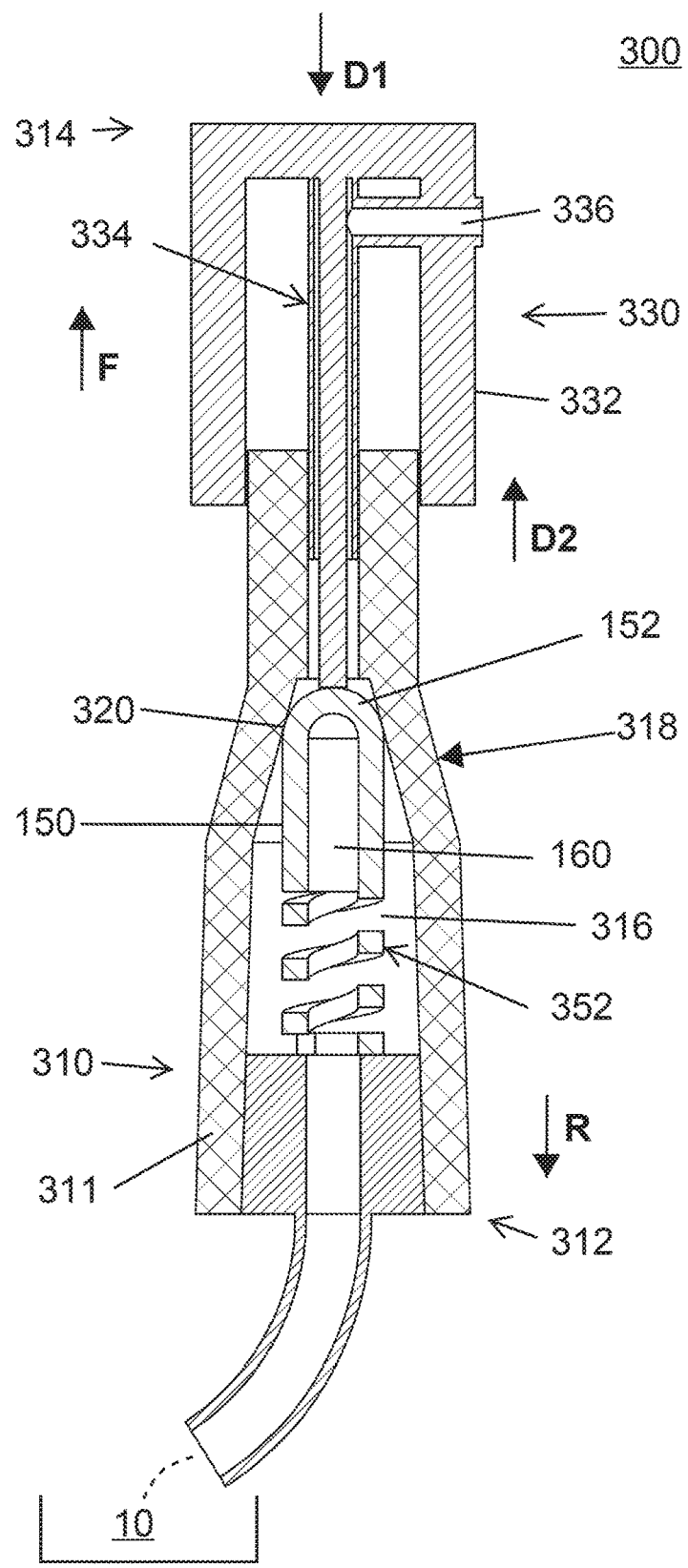
FIG. 4 is a side cross-sectional view of a flow control valve according to yet another example.

FIG. 4 shows a flow control valve 300 according to another example. The flow control valve 300 is a dispensing valve that can be selectively placed in an open configuration to permit fluid flow only in the forward direction F, and selectively placed in a closed configuration to prevent fluid flow in the forward direction F and the backward direction R.

Referring to FIG. 4, the flow control valve 300 includes a housing 310, the sealing member 150 configured to reciprocate within the housing 310 to control the flow of the fluid through the housing 310, and a control mechanism 330 operable to move the sealing member 150 to place the flow control valve 300 in an open configuration. The housing 310 includes a generally tubular wall 311, a first end 312, and a second end 314. The tubular wall 311 surrounds an interior passage 316 and includes a flow control section 318 between the first end 112 and the second end 114. The flow control section 318 includes a conical inner wall surface 320 in the interior of the housing 310. The conical inner wall surface 320 provides a conical sealing surface for the sealing member 150.

The flow control valve 300 may be connected to a fluid supply 10 at the first end 312 of the control valve 300. Because the sealing member 150 is highly buoyant, pressure from fluid in the fluid reservoir 10 and around the sealing member 150 in the interior passage 316 biases the flow control valve 300 in a closed configuration. That is, the sealing member 150 is biased in a sealing position in which the hemispherical tip 152 of the sealing member 150 engages the conical inner wall surface 320 to form a complete seal between the sealing member 150 and the conical inner wall surface 320, thereby preventing fluid flow in the forward direction F and the backward direction R.

To provide the sealing member 150 with a greater bias force in the sealing position and to provide a faster return of the sealing member 150 to the sealing position from an open position, a biasing spring 352 may be provided in the interior passage 316 in engagement with the sealing member 150. The biasing spring 352 may be attached to an end of the sealing member 150 opposite the hemispherical tip 152, or formed integrally with the sealing member 150 at the end of the sealing member 150 opposite the hemispherical tip 152.

The control mechanism 330 is attached to the housing 310 at the second end 314 of the housing 310. The control mechanism 330 includes a body member 332 configured to slide over the housing 310, a rod 334 connected to the body member 332 and configured to reciprocate in the interior passage 316, and a fluid channel 336 in fluid communication with the interior passage 316, and extending through the body member 332 and around the rod 334. The rod 334 is configured to engage the hemispherical tip 152 of the sealing member 150.

When the body member 332 is depressed in an operating direction D1, the body member 332 slides over the housing 310 in the direction D1 and the rod 334 moves the sealing member 150 to the open position out of contact with the conical sealing surface 320. The flow control valve 300 is thereby placed in the open configuration, allowing fluid flow only in the forward direction F from the fluid supply 10 to the interior passage 316 and the fluid channel 336. When the body member 332 is released and allowed to return to its rest position in the direction D2 opposite the operating direction D1, the rod 334 moves in the direction D2 and allows the sealing member 150 to return to the sealing position under the biasing force provided by fluid pressure (and, optionally, the biasing spring 352), thereby placing the flow control valve 300 in the closed configuration.

The flow control valves disclosed herein provide precise control of fluid flow and fast transitions between open and closed configurations. Additionally, the disclosed flow control valves may be manufactured at relatively low cost.

Words describing relative spatial relationships, such as "forward", "backward", "top" and "bottom" may be used to conveniently describing spatial relationships of one device or elements with other devices or elements. Such words are to be interpreted as encompassing a device oriented as illustrated in the drawings, and in other orientations in use or operation. For example, an example in which an element as moving forward also encompasses the element moving backward when the orientation of the device is reversed in use or operation.

While this disclosure includes specific examples, it will be apparent to one of ordinary skill in the art that various changes in form and details may be made in these examples without departing from the spirit and scope of the claims and their equivalents. The examples describing herein are to be considered in a descriptive sense only, and not for purposes of limitation. Descriptions of features or aspects in each example are to be considered as being applicable to similar features or aspects in other examples. Suitable results may be achieved if the describing techniques are performed in a different order, and/or if components in a describing system or device are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a flow control valve housing, comprising:
    flowing a fluid material into a mold to form
        a housing comprising
            a tubular wall surrounding an interior passage, and
            a flow control section in which the tubular wall comprises a conical inner wall surface, wherein the tubular wall has a predetermined radial thickness in the flow control section, and
            a protrusion disposed on an external surface of the tubular wall at the flow control section, wherein the protrusion extends in a radial direction with respect to a central axis of the tubular wall and comprises a predetermined protrusion thickness in a direction perpendicular to the radial direction; and
    cooling and solidifying the fluid material in the mold to cause a recess to form on the inner wall surface in a position radially aligned with the protrusion on the tubular wall.

2. The method of claim 1, wherein the recess comprises a radial depth that is a predetermined function of the radial wall thickness and the protrusion thickness.

* * * * *